(12) United States Patent
Merritt

(10) Patent No.: US 10,759,579 B2
(45) Date of Patent: Sep. 1, 2020

(54) PRODUCT DISPENSERS

(71) Applicant: Amaris Enterprises, LLC, Odessa, FL (US)

(72) Inventor: Alyse N. Merritt, Odessa, FL (US)

(73) Assignee: Amaris Enterprises, LLC, Odessa, FL (US)

( * ) Notice: Subject to any disclaimer, the term of this patent is extended or adjusted under 35 U.S.C. 154(b) by 0 days.

(21) Appl. No.: 15/828,370

(22) Filed: Nov. 30, 2017

(65) Prior Publication Data
US 2019/0161260 A1 May 30, 2019

(51) Int. Cl.
| B65D 75/58 | (2006.01) |
| B65D 75/30 | (2006.01) |
| B65D 75/52 | (2006.01) |
| A23L 27/18 | (2016.01) |
| A23L 27/60 | (2016.01) |

(52) U.S. Cl.
CPC .......... B65D 75/30 (2013.01); B65D 75/527 (2013.01); B65D 75/5811 (2013.01); *A23L 27/18* (2016.08); *A23L 27/63* (2016.08)

(58) Field of Classification Search
CPC .. B65D 75/30; B65D 75/5811; B65D 75/527; B65D 75/5822; B65D 75/42; B65D 75/5855; A23L 27/63; A23L 27/18
USPC ................. 222/215, 94, 541.6, 107
See application file for complete search history.

(56) References Cited

U.S. PATENT DOCUMENTS

| 717,964 | A | * | 1/1903 | Batdorf | G07D 9/006 229/87.2 |
| 1,438,487 | A | * | 12/1922 | Greene | B05B 11/041 222/215 |
| 2,776,787 | A | * | 1/1957 | Nicol | B65D 17/502 222/544 |
| 3,155,282 | A | * | 11/1964 | Leblanc | B65D 75/5811 222/107 |
| 3,189,227 | A | * | 6/1965 | Hobbs | B65D 75/40 206/820 |
| 3,199,437 | A | * | 8/1965 | Nelsen | A47J 31/02 206/219 |
| 3,278,085 | A | * | 10/1966 | Brown | B65D 75/5811 206/484 |
| 3,650,391 | A | * | 3/1972 | Chung | B65D 1/30 206/223 |
| 3,913,789 | A | * | 10/1975 | Miller | B65D 75/5822 206/484 |
| 3,961,743 | A | * | 6/1976 | Hollowell | B65D 33/1608 383/7 |
| 3,993,222 | A | * | 11/1976 | Briggs | A61J 1/05 222/107 |
| 4,537,308 | A | * | 8/1985 | Hollander, Jr. | B65D 81/3266 206/219 |
| 4,572,377 | A | * | 2/1986 | Beckett | B65D 75/5844 383/204 |

(Continued)

*Primary Examiner* — Charles Cheyney
(74) *Attorney, Agent, or Firm* — The Concept Law Group, PA; Scott D. Smiley; Scott M. Garrett

(57) ABSTRACT

A pull tab assembly is described for condiment dispensers such that one or more pull tabs are disposed on a dispenser. An alternative teaches opposing pull tab assemblies placed on either end of a condiment dispenser. A slanted edge associated with the pull tab facilitates the opening of the dispenser. Another embodiment teaches acute angle dispensing devices and alternatively having a flap about the acute angle dispensing devices.

16 Claims, 7 Drawing Sheets

(56) References Cited

U.S. PATENT DOCUMENTS

| | | | | |
|---|---|---|---|---|
| 4,588,078 | A * | 5/1986 | Ferrero | B65D 75/5811 |
| | | | | 206/216 |
| 4,872,556 | A * | 10/1989 | Farmer | B65D 75/5822 |
| | | | | 222/107 |
| 4,911,938 | A * | 3/1990 | Fisher | B65D 81/3461 |
| | | | | 219/727 |
| 5,035,348 | A * | 7/1991 | Seifert | B65D 75/58 |
| | | | | 222/107 |
| 5,497,913 | A * | 3/1996 | Baker | A61C 9/0026 |
| | | | | 222/102 |
| 6,348,246 | B1 * | 2/2002 | Finestone | B32B 27/10 |
| | | | | 206/524.2 |
| 6,439,792 | B1 * | 8/2002 | Beguin | B65D 75/5811 |
| | | | | 206/484 |
| 6,581,764 | B1 * | 6/2003 | Hillebrand | B65D 75/42 |
| | | | | 206/225 |
| 6,624,130 | B2 * | 9/2003 | Giblin | B65D 75/5811 |
| | | | | 229/307 |
| 6,708,738 | B2 * | 3/2004 | Olsen | B65D 75/5822 |
| | | | | 141/114 |
| 7,921,999 | B1 * | 4/2011 | Kimball | A61F 13/00063 |
| | | | | 206/440 |
| 8,720,749 | B1 * | 5/2014 | Greco | B65D 75/5822 |
| | | | | 222/1 |
| 2003/0116453 | A1 * | 6/2003 | Russo | B32B 7/12 |
| | | | | 206/308.1 |
| 2007/0119862 | A1 * | 5/2007 | Backes | B65D 1/095 |
| | | | | 222/94 |
| 2013/0209003 | A1 * | 8/2013 | Hansen | B65D 31/02 |
| | | | | 383/200 |
| 2014/0175124 | A1 * | 6/2014 | Nathan | B65D 75/5811 |
| | | | | 222/107 |
| 2017/0225192 | A1 * | 8/2017 | Compton | B05C 17/00583 |

* cited by examiner

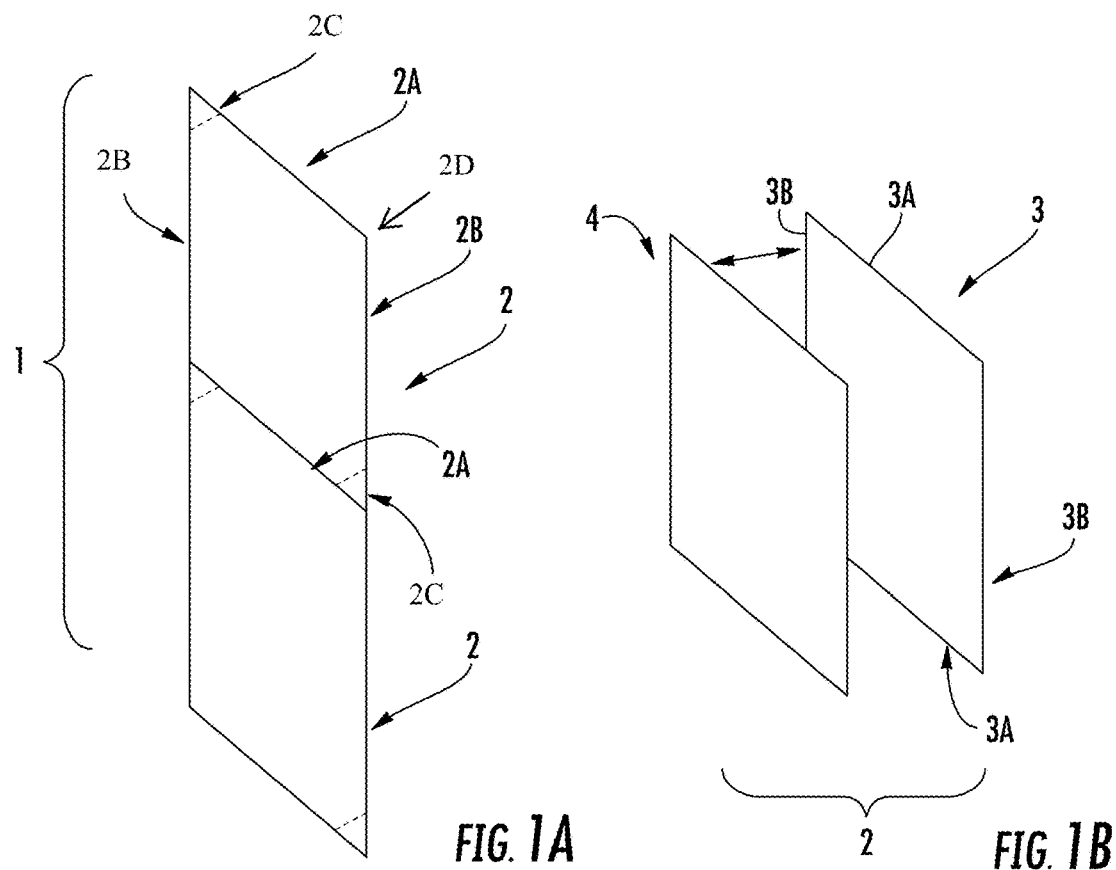
FIG. 1A
FIG. 1B
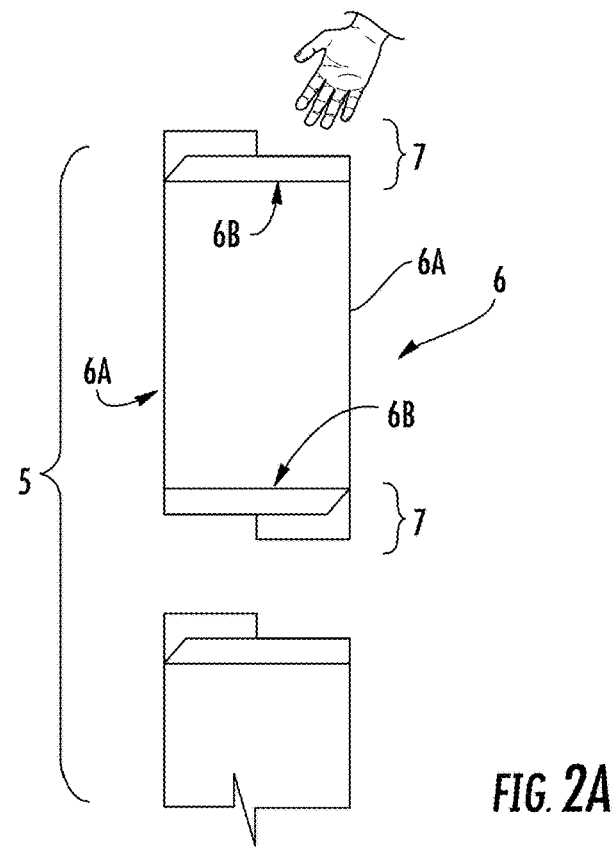
FIG. 2A

PRODUCT DISPENSERS

FIELD OF THE INVENTION

The present invention relates to condiment dispensers; more particularly, the present invention relates to various novelties facilitating the opening of the aforementioned condiment dispensers for easy expulsion of the contents therefrom.

BACKGROUND OF THE INVENTION

Foil type condiment dispensers have been available for many decades serving ketchup, mustard and similar condiments. Additionally, these devices have also been used to dispense other types of liquids such as soaps, conditioners, perfume and other such substances.

Typically two mirror leaves of foil material are brought together and heat sealed or glued near the perimeter thereof along the various sides of the leaves of material. A suitable pre-perforation, or weaker material is made at or near an junction point between two sides of the condiment dispenser so as to permit easy cutting of this junction point away from the rest of the device. Thus, a user cuts along this portion removing a piece of material of the junction zone and proceeds to dispense the material therefrom.

However, there are problems with this approach in that the current system is very messy leaving condiment material on the external surface of the dispenser. Also, the cutting of the junction is many times not easily performed.

Accordingly, there remains a need in the art for a condiment dispenser that more readily maintains a clean surface of the condiment dispenser and permits the simple and easy opening of the dispenser.

SUMMARY OF THE INVENTION

The present invention overcomes the deficiencies of the known art and the problems that remain unsolved by providing a method and respective apparatus for packaging and consumption of take out appetizers, entrees, and desserts.

A dispenser comprising:
a top planar member;
a bottom planar member, wherein a first peripheral edge of the top planar member and a corresponding first peripheral edge of the bottom planar member are permanently joined to form a first lateral edge, and wherein a second peripheral edge of the top planar member and a corresponding first peripheral edge of the bottom planar member are permanently joined to form a second lateral edge;
a first forward edge extending from the first peripheral edge at an angle relative to the first peripheral edge;
a second forward edge extending from the second peripheral edge at an angle relative to the second peripheral edge, wherein the second forward edge meets the first forward edge at a point to form a forward arrowhead shape;
a first rear edge extending inwardly into an area between the first peripheral edge and the second peripheral edge from a rear end of the first lateral edge at an angle relative to the first lateral edge; and
a second rear edge extending inwardly into an area between the first peripheral edge and the second peripheral edge from a rear end of the second lateral edge at an angle relative to the second lateral edge and meeting the first rear edge at a central vertex to form an inverted arrowhead shape at a rear of the dispenser,
wherein the forward arrowhead shape and the inverted arrowhead shape are complimentary,
wherein the top planar member and the bottom planar member are permanently joined at the first forward edge and the second forward edge, and
wherein the top planar member and the bottom planar member are permanently joined at the first rear edge and the second rear edge.

In another aspect, wherein the top planar member and the bottom planar member both include foil.

In another aspect, wherein the top planar member and the bottom planar member are joined using heat treatment.

In another aspect, wherein the top planar member and the bottom planar member are joined using adhesive.

In another aspect, further comprising a plurality of dispensers formed along a top planar member trip and a bottom planar member strip.

In another aspect, wherein one of the dispensers is formed so that the forward arrowhead shape is adjacent to a rear inverted arrowhead shape of a subsequent dispenser.

In another aspect, further comprising a small triangular section defined at a tip of the forward arrowhead shape.

In another aspect, wherein the small triangular section is joined using a weaker adhesive or heat treatment to make the small triangular section easier to rupture than other portions of the dispenser when pressure is applied to the dispenser.

In another aspect, wherein the small triangular section is partially perforated to facilitate cutting of a tip of the forward arrowhead shape defined by the small triangular section.

A plurality of dispensers formed along a top planar member strip and a bottom planar member strip, each dispenser formed so that a forward arrowhead shape is adjacent to a rear inverted arrowhead shape of a subsequent dispenser, each dispenser comprising:
a top planar member;
a bottom planar member,
wherein a first peripheral edge of the top planar member and the bottom planar member are permanently joined to form a first lateral edge, and wherein a second peripheral edge of the top planar member and the bottom planar member are permanently joined to form a second lateral edge;
a first forward edge extending from the first peripheral edge at an angle relative to the first peripheral edge;
a second forward edge extending from the second peripheral edge at an angle relative to the second peripheral edge, wherein the second forward edge meets the first forward edge at a point to form the forward arrowhead shape;
a first rear edge extending inwardly into an area between the first peripheral edge and the second peripheral edge from a rear end of the first lateral edge at an angle relative to the first lateral edge; and
a second rear edge extending inwardly into an area between the first peripheral edge and the second peripheral edge from a rear end of the second lateral edge at an angle relative to the second lateral edge and meeting the first rear edge at a central vertex to form the rear inverted arrowhead shape at a rear of the dispenser,
wherein the forward arrowhead shape and the rear inverted arrowhead shape are complimentary,
wherein the top planar member and the bottom planar member are permanently joined at the first forward edge and the second forward edge, and wherein the top planar member and the bottom planar member are permanently joined at the first rear edge and the second rear edge.

In another aspect, wherein the top planar member and the bottom planar member both include foil.

In another aspect, wherein the top planar member and the bottom planar member are joined using heat treatment.

In another aspect, wherein the top planar member and the bottom planar member are joined using adhesive.

In another aspect, further comprising a small triangular section defined at a tip of the forward arrowhead shape.

In another aspect, wherein the small triangular section is joined using a weaker adhesive or heat treatment to make the small triangular section easier to rupture than other portions of the dispenser when pressure is applied to the dispenser.

In another aspect, wherein the small triangular section is partially perforated to facilitate cutting of a tip of the forward arrowhead shape defined by the small triangular section.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which:

FIG. 1A presents a front view of a roll of condiment dispensers having a trapezoidal type shape and pronounced junction points in an embodiment taught herein.

FIG. 1B presents a view of two leaves of foil material that are brought together forming a novel condiment dispenser as taught in an embodiment.

FIG. 2A presents a view of a roll of condiment dispensers having an pull tab of material for easy opening of the condiment dispenser in an embodiment taught herein.

Like reference numerals refer to like parts throughout the several views of the drawings.

DETAILED DESCRIPTION

Figure 2B:
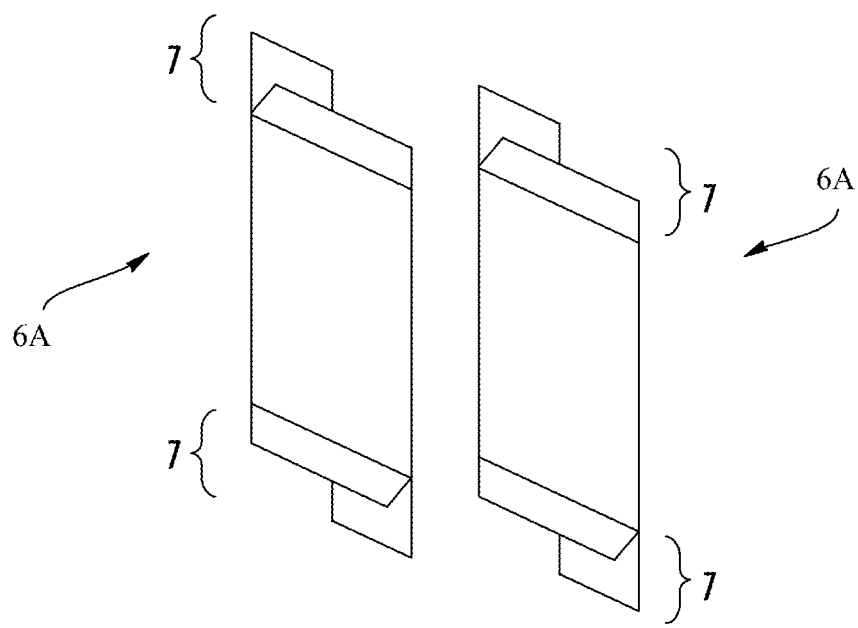
FIG. 2B presents a view of two mirror leaves of a condiment dispenser for bringing them together forming a complete condiment dispenser having pull tab of material for easy opening of the condiment dispenser in an embodiment taught herein.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in each figure.

Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

FIG. 1A presents a front view of a roll of condiment dispensers having a trapezoidal type shape and pronounced junction points in an embodiment taught herein. A roll 1 of dispensers 2 is arranged front to end so that the front of a first dispenser impacts the end of another and so forth for easy cutting of the dispensers 2 one from each other. Each dispenser has a front end and an opposite back end 2A as well as a first side and second side 2B. The connection between either of the ends 2A and one of the sides 2B forms junction points 2C whereby material may more easily be removed from the container because of the acute angle between one of the ends and one of the sides. The other junctions 2D between either of the two ends 2A and the opposite one of the sides 2B from the first choices forms an obtuse angle.

FIG. 1B presents a view of two leaves of foil material 3, 4 that are brought together forming a novel condiment dispenser as taught in an embodiment. A first leaf of material has a front end and an opposite back end 3A as well as a first side and second side 3B. The second leaf of material 4 has corresponding sides and ends to the first leaf and these same are brought together and heat treated or glued together at manufacture.

FIG. 2A presents a view of a roll 5 of condiment dispensers 6 connected end to end having an pull tab of material for easy opening of the condiment dispenser in an embodiment taught herein. A dual foil condiment dispenser 6 has two foil leaves connected together along a periphery thereof. The dispenser 6 has two longitudinal sides 6A connected at appropriate end points to two corresponding transverse sides 6B thereby forming a rectangular shape.

Thus, a first longitudinal side 6A has a first endpoint connected to an endpoint of a first transverse side 6B and the second endpoint of the first longitudinal side 6A is connected to an endpoint of the second transverse side 6B. Similarly, the second longitudinal side 6A has a third endpoint connected to another endpoint of a first transverse side 6B and the fourth endpoint of the second longitudinal side 6A is connected to the other endpoint of the second transverse side 6B. Finally, at either end of the condiment dispenser 6 is an easy pull tab 7 mechanism for the easy opening of the dispenser as more fully shown in FIG. 2C. Each pull tab 7 is disposed such that the next one in the roll complements the previous one in the sequence; thus, there is a space for the previous or next one in the sequence at the back or forward end of the dispenser 6 respectively.

FIG. 2B presents a view of two complementary leaves 6A of a condiment dispenser for bringing them together forming a complete condiment dispenser having pull tab of material for easy opening of the condiment dispenser in an embodiment taught herein. The two mirror leaves are brought together and connected by heat treatment, adhesive connection or gluing.

Figure 2C:
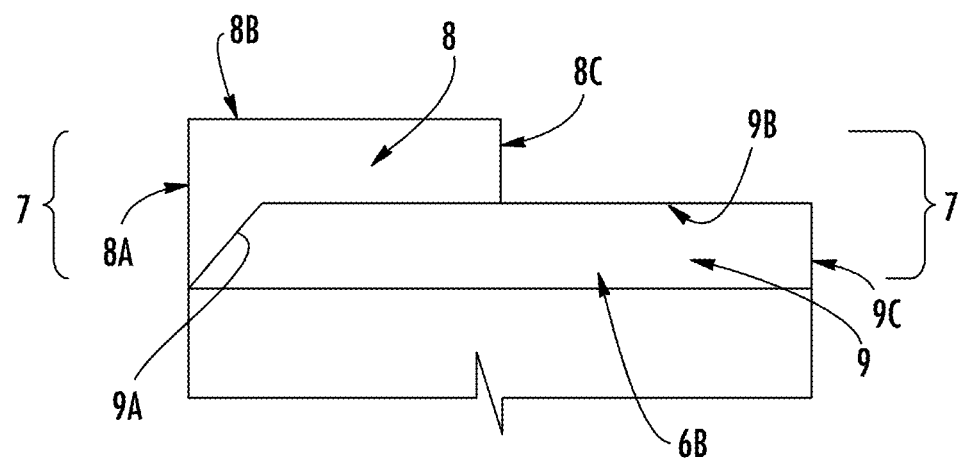
FIG. 2C presents a closeup view of the pull tab of FIGS. 2A-2B and associated structures at the end of the device in an embodiment taught herein.

FIG. 2C presents a closeup view of the pull tab of FIGS. 2A-2B and associated structures at the end of the device in an embodiment taught herein. Here 6B is a transverse side at either end of the condiment dispenser 6 integrally and directly formed with a first piece of foil material 9 that in turn is integrally formed with a second piece of foil material 8. The first piece of foil material 9 is generally rectangular in shape except for the slant edge 9A that slants drastically at a sharp edge facilitating the severing of the condiment container; the first piece of foil material 9 also has a top edge 9B (ending at one end with the slant edge 9A) that is parallel to the transverse side 6B and perpendicular to the extension 9C that completes the upward length of the longitudinal side 6A of the dispenser 6.

The second piece of foil material 8 is integrally formed about a portion of the first piece of foil material 9 and extends half way along its length; thus, allowing for the placement of a corresponding pull tab 7 on a preceding or succeeding dispenser 6 in a roll 5. Midway along the total transverse width of dispenser 6 is a perpendicular edge portion 8C integrally formed and rising above the first piece of material 9 ending at a point that presents another edge portion 8B directed laterally and parallel to the top edge 9B and to the transverse side 6B.

This edge portion 8B ends and integrally forms with an extension portion 8A that also integrally forms with the junction between an end of the transverse side 6B, the longitudinal side 6A and the slant edge 9A. Because of this shape the pull tab assembly or mechanism generally formed at 7 has a tab generally formed as the second piece of foil material 8. A user grasps this mechanism and cuts it horizontally and then down the slant edge in the picture along an edge 9A.

A variant of this system has the slant edge 9A extending all the way towards the junction between perpendicular edge portion 8C and top edge 9B instead of having a horizontal portion 9. As another alternative, there is a space between the pull tab of one sequence and the corresponding pull tab of the succeeding or preceding sequence so that their is little or no horizontal portion 9.

Figure 3A:
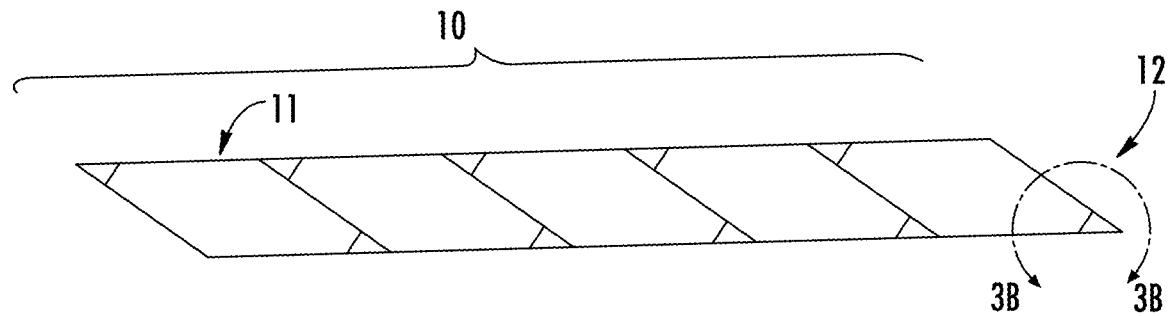
FIG. 3A presents a roll of condiment dispensers in another embodiment taught herein.

FIG. 3A presents a roll of condiment dispensers in another embodiment taught herein. A roll 10 of condiment dispensers 11 is arranged with the narrow end of one dispenser impacting the narrow front of another and so forth. Formed as a trapezoidal type shape, each dispenser 11 has an angle (less than 90 degrees) between the narrow front end and a first longitudinal side of the dispenser 11 as well as an angle (less than 90 degrees) between the opposite narrow end of the same dispenser and the second longitudinal side where the angle is opposite the first one. The junction 12 between each longitudinal side and the corresponding narrow front or narrow back ends, forms a node for the opening and expulsion of materials from the dispenser 11. These junction are acute angles whilst the two other angles of the trapezoid shape are obtuse angles.

Figure 3B:
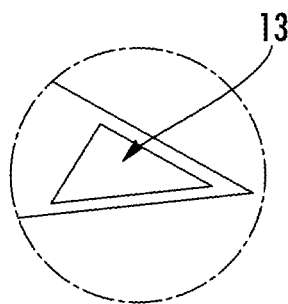
FIG. 3B presents a closeup view of a junction for the opening of a condiment dispenser as taught in the embodiment of FIG. 3A.

FIG. 3B presents a closeup view of a junction for the opening of a condiment dispenser as taught in the embodiment of FIG. 3A. The junction 12 is more clearly shown here showing an end and a side having a triangular flap 13 attached to the surface thereof. The flap 13 is attached along one leg of its triangular shape to the surface of one side of one of the mirrored leaves making up the body of the dispenser 11 and sits nearby the edge of the end and the edge of the side. Alternatively, instead of a flap one cuts open the acute angle end; it is further optionally partially pre-perforated.

Figure 3C:
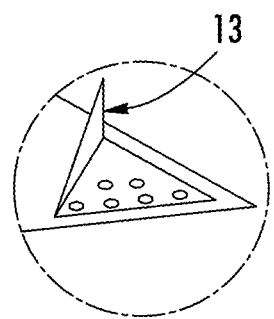
FIG. 3C presents a closeup view of a flap for the opening of the junction point of in the embodiment of FIGS. 3A-3B.

FIG. 3C presents a closeup view of a flap for the opening of the junction point of in the embodiment of FIG. 3A-3B. Here is shown how the flap is opened revealing dispenser holes 14 underneath; the holes can penetrate only on one of the leaves or optionally all the way through both mirror leaves making up the body of the dispenser; in this second optional system, there is a flap also on the opposite mirror leaf. The holes have been pre-pressed into the leaves of material for expulsion of condiments or other substances from the body of the dispenser 11.

Figure 3D:
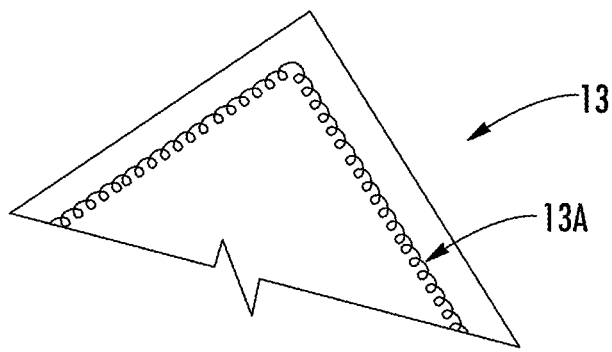
FIG. 3D presents a closeup views of the flap in the embodiment of FIGS. 3A-3C.

FIG. 3D presents a closeup view of the flap in the embodiment of FIG. 3A-3C. The flap 13 has been prepared having a gum, rubber, silicone, adhesive or gel 13A for loose attachment of the edge of the flap 13 with the surface of the leaf material making up the side of the dispenser.

Figure 4A:
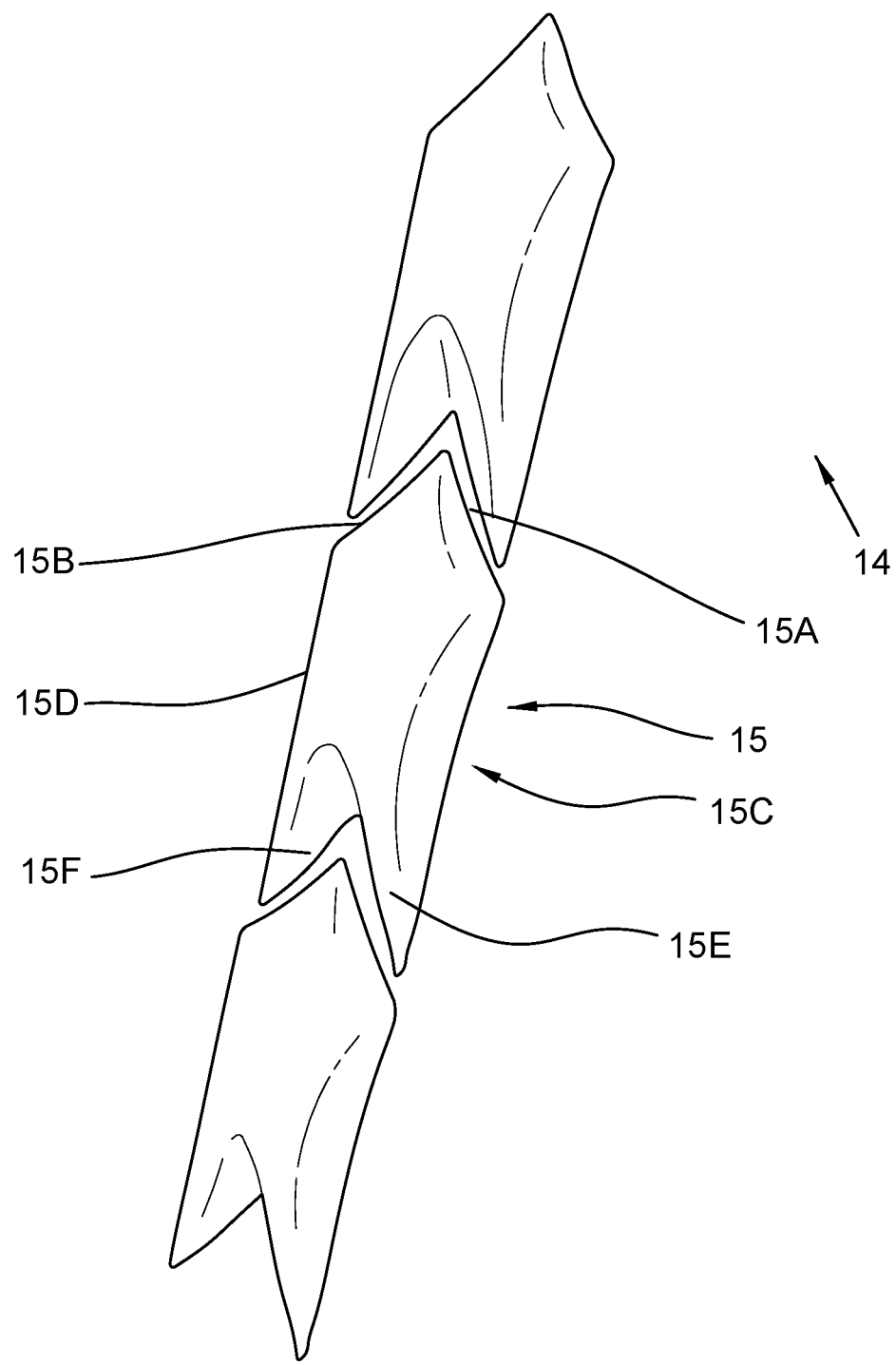
FIG. 4A presents a view of an alternative embodiment having a group of arrowhead condiment dispensers as disclosed herein.

FIG. 4A presents a view of an alternative embodiment having a group of arrowhead condiment dispensers as disclosed herein. Each one of the group 14 of three condiment dispensers 15 is formed from a top and a bottom piece of foil; these are heat treated or adhesively sealed about the respective peripheral edges of the top piece of foil with the bottom piece of foil. The dispenser 15 has an arrowhead shape at its forward portion having two forward parts 15A, 15B of a triangle.

This forward portion two parts 15A, 15B of the dispenser 15 sits in the rear portion of the next dispenser 15 in line ahead of it. Thus, the rear portion of each dispenser 15 is shaped as an indented arrowhead having two rear parts 15E, 15F of a corresponding triangle to that of the forward portion made of two forward parts 15A, 15B. The forward parts 15A, 15B come together at an arrowhead point and each slant down meeting only one of the lateral edges 15C, 15D respectively. These lateral edges 15C, 15D proceed back down until they reach the indented arrowhead shape and integrate with the corresponding rear parts 15E, 15F such that the lateral edges 15C, 15D meet only one of the respective rear parts 15E, 15F. These two rear parts 15E, 15F slant inwards until they reach a central vertex that corresponds to the arrowhead point of a forward portion.

It should be apparent from this discussion that the forward arrowhead 15A, 15B of a current dispenser 15 is attached during manufacture to the next in line's indented arrowhead shape 15E, 15F. Similarly, the current dispenser 15 has a rear indented arrowhead shape 15E, 15F that is made for the forward arrowhead 15A, 15B of a previous dispenser 15 in the line. During manufacture the entire strip of top and bottom pieces of foil materials are suitably heat treated or adhesively sealed and a cutting tool is employed to cut each dispenser as described.

Figure 4B:
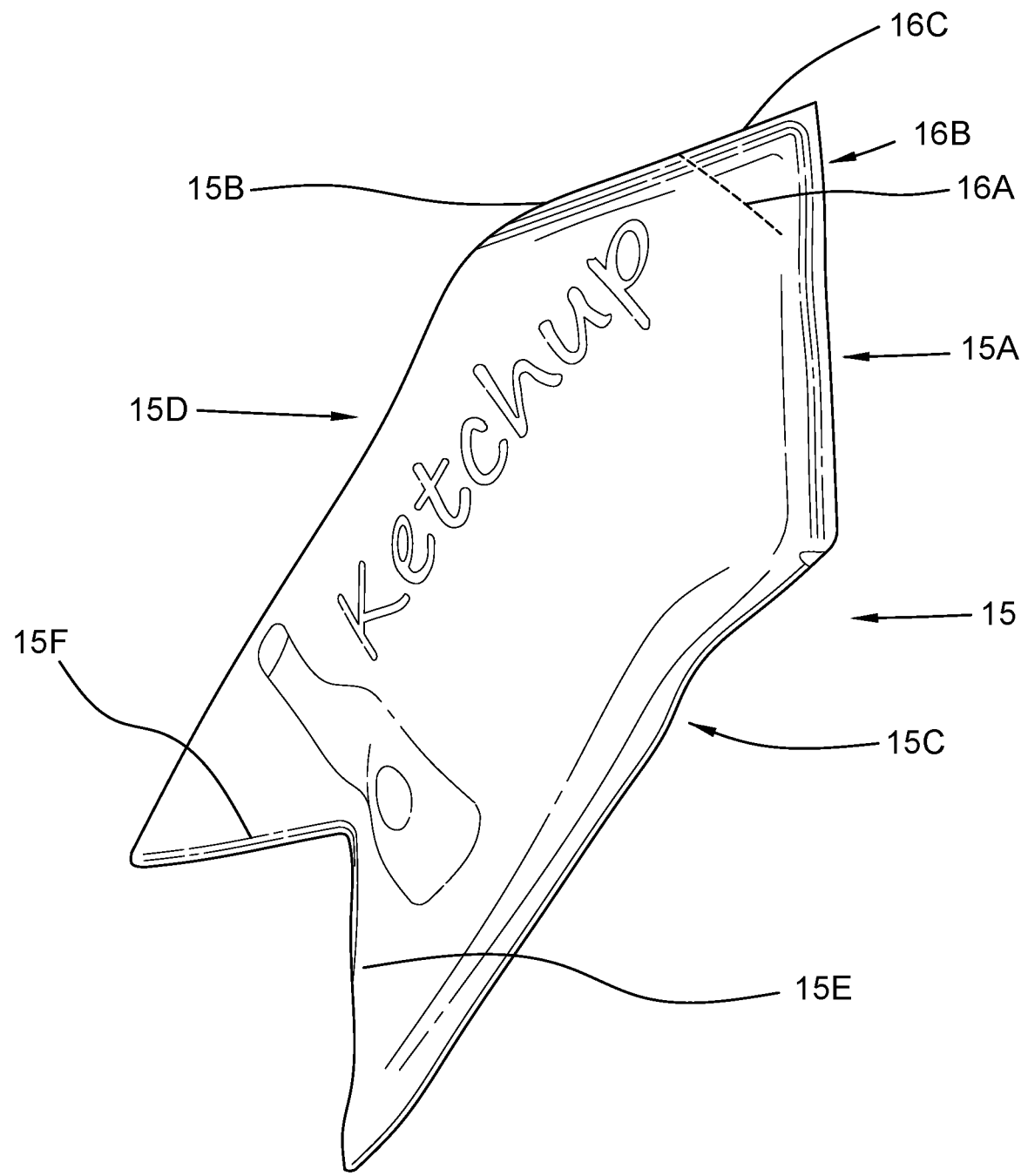
FIG. 4B presents a view of a single arrowhead condiment dispenser in an alternative embodiment disclosed herein.

FIG. 4B presents a view of a single arrowhead condiment dispenser in an alternative embodiment disclosed herein. The forward parts 15A, 15B come together at an arrowhead point and each slant down meeting only one of the lateral edges 15C, 15D respectively. These lateral edges 15C, 15D proceed back down until they reach the indented arrowhead shape and integrate with the corresponding rear parts 15E, 15F such that the lateral edges 15C, 15D meet only one of the respective rear parts 15E, 15F. These two rear parts 15E, 15F slant inwards until they reach a central vertex that corresponds to the arrowhead point of a forward portion.

The front arrowhead made of forward parts 15A, 15B also has a smaller portion thereof 16A, 16B integrally formed respectively from portions of the aforementioned. Further, along with 16A, 16B, a dotted line 16C on the body of the top and or bottom foil thus completes a smaller triangle shape within the much large arrowhead. This is used as a location for expulsion of materials from the inner spaces of the dispenser 15. To accomplish this, the small triangular shape or tip uses weak adhesive or a small amount of heat sealing on the peripheral portions (16A, 16B) where the top and bottom foil meets each other at this tip. Thus, when sufficient pressure is applied to the center of the packet, it would cause a puncture to the tip thereby releasing the contents. Alternatively, a user can rupture the package by cutting across the line; further, this may also be optionally partially perforated so as to facilitate the cutting thereof.

Figure 5A:
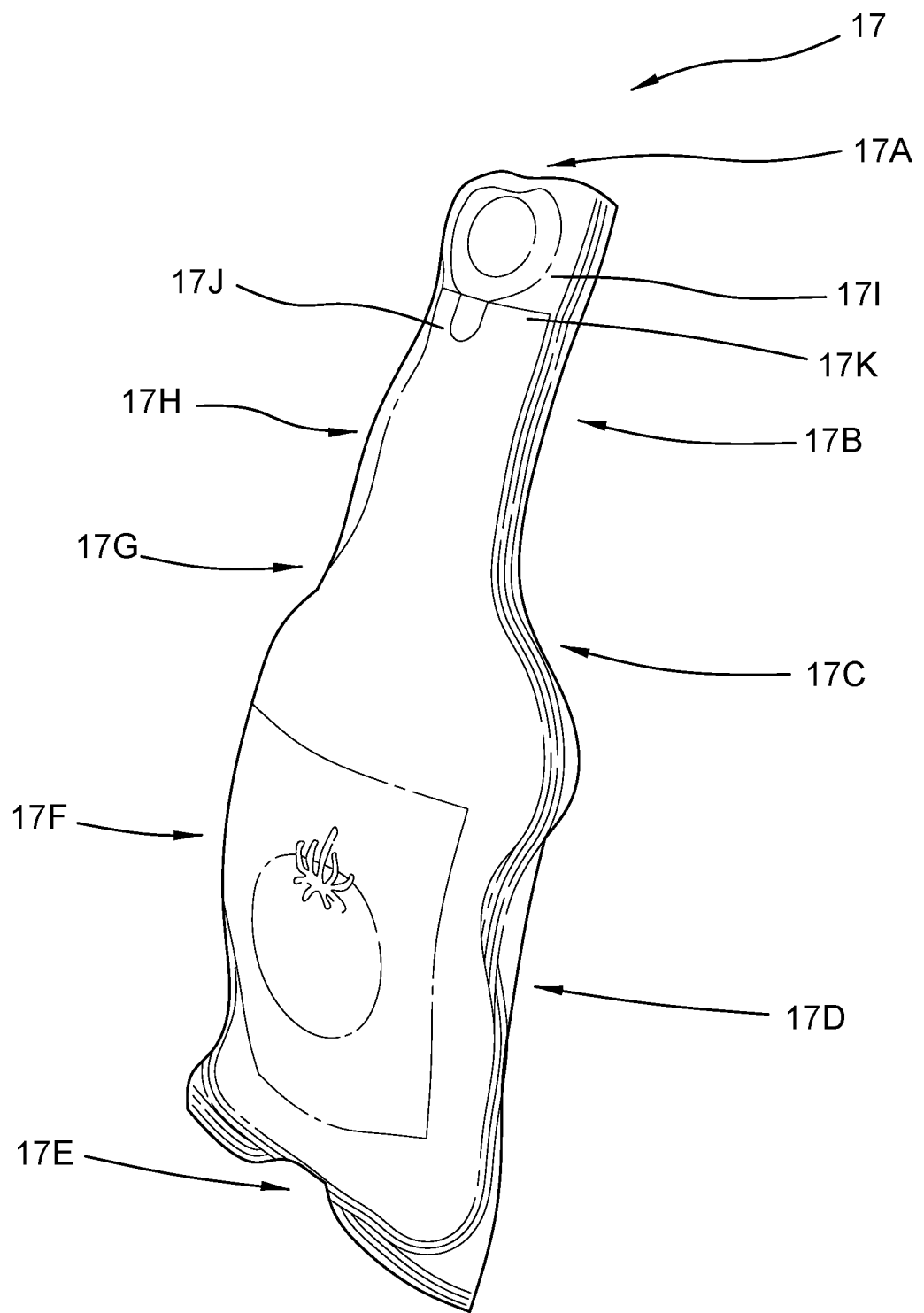
FIG. 5A presents a view of a dispenser in another alternative embodiment disclosed herein.

FIG. 5A presents a view of a dispenser in another alternative embodiment disclosed herein. A dispenser 17 is shaped as a ketchup bottle in this view. The dispenser 17 is made of top and bottom foils that are heat or adhesive sealed along peripheral edges so that they come together thereat. A top portion 17A integrates at a first end and second end with a single one of two narrow sides 17B, 17H. The narrow sides 17B, 17H proceed to integrate with one of two intermediate sides 17C, 17G that slope outwards broadening the with the of bottle shape. These intermediate sides 17C, 17G further integrate with one of two larger linear sides 17D, 17F that in turn integrate at one of two ends of a base 17E respectively.

A piece of round foil 17I having an integral pull strip 17J is attached to the top foil at the end of the dispenser 17 near the top portion 17A. Under it a precut opening permits the expulsion of contents when the pull strip 18A is removed therefrom. Alternatively, the entire white flap where the "bottle cap" is could peel off in one swoop from left to right. This would make it look like the actual cap of the bottle was coming off for ketchup to neatly pour out of. In this option, the top foil has slight partial perforations (or weaker material) along the white neck of the bottle cap at 17K so this permits the removal of the material at this point (or optionally more rising along the lateral edges of the bottle cap and near or at the top edge 17A thereof). This can be augmented by a peel strip that hangs from the top material thereby facilitating the ripping of the top material therefrom. Another option has the slight perforations (or weaker material) on the bottom foil as well corresponding to the top portion perforations so as to permit the optional removal of the entire simulated bottle cap in the figure.

Figure 5B:
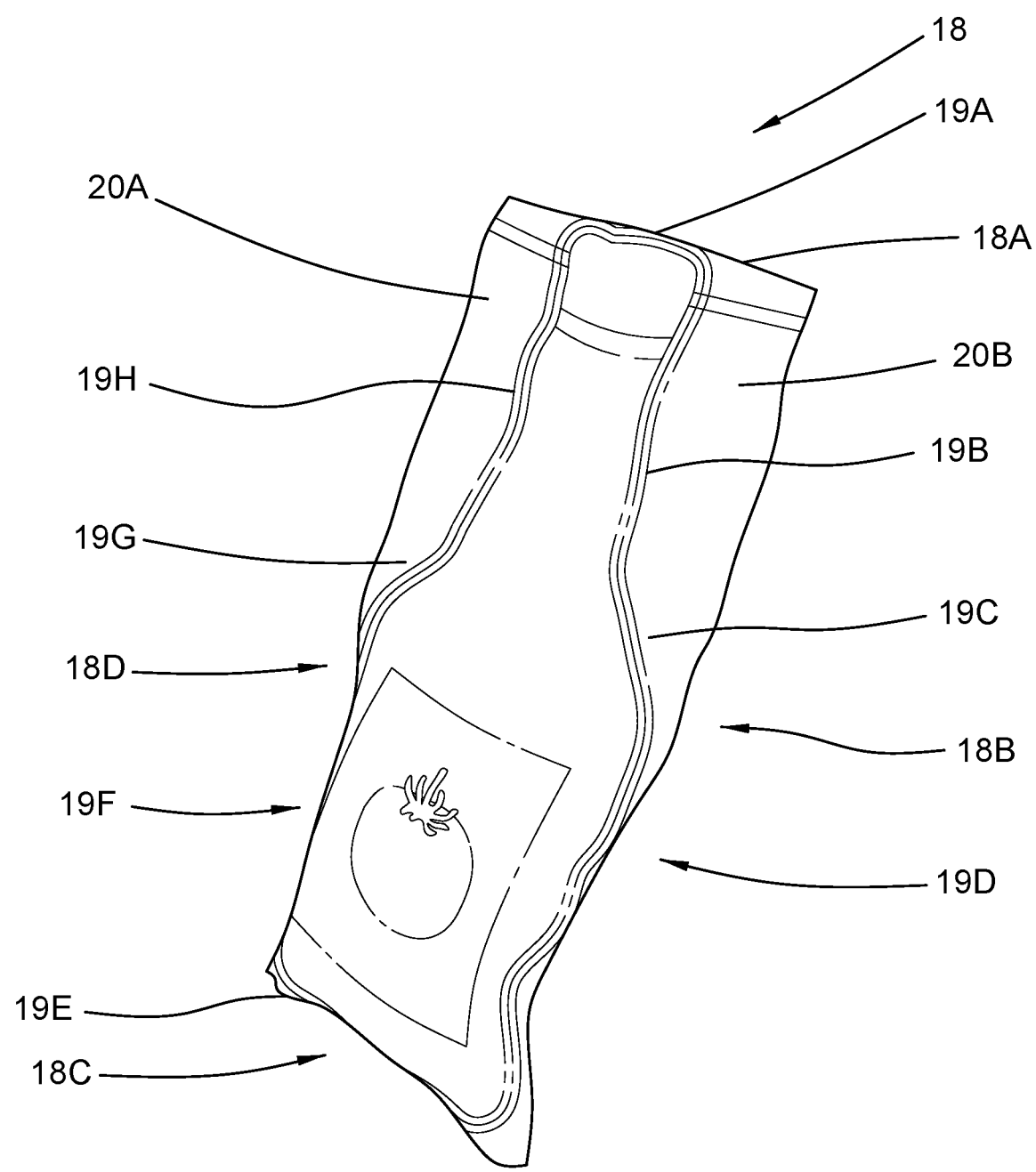
FIG. 5B presents a view of a dispenser in yet another alternative embodiment disclosed herein.

FIG. 5B presents a view of a dispenser in yet another alternative embodiment disclosed herein. A dispenser 18 is shaped as a rectangle having a containment space in the shape of ketchup bottle in this view. The dispenser 18 is made of top and bottom foils that are heat or adhesive sealed along peripheral edges so that they come together thereat along with similar seals along the narrower body portions of the bottle shape as it impacts the other parts of the material for example 20A, 20B.

The main shape of the condiment dispenser 18 is rectangular having two narrow edges 18A, 18C opposite one another and each having two ends; each of these (18A, 18C) integrates at one end with longitudinal edges 18B, 18D that similarly are disposed opposite one another and have two ends. A top portion 19A integrates at a first end and second end with a single one of two narrow sides 19B, 19H. The narrow sides 19B, 19H proceed to integrate with one of two intermediate sides 19C, 19G that slope outwards broadening the with the of bottle shape. These intermediate sides 19C, 19G further integrate with one of two larger linear sides 19D, 19F that in turn integrate at one of two ends of a base 19E respectively. It should be apparent that the material of the top and bottom foil proximal to the narrow sides 19B, 19H is sealed together to force the top and bottom foils into a ketchup bottle shape. Thus, this forms two lateral flanges 20A, 20B on either side of these narrow sides 19B, 19H. The material can be expelled from the dispenser in a similar fashion as in FIG. 5A or by ripping a partially pre-perforated portion thereof, for example if the dark horizontal line at either side and through the white portion of the bottle cap is a pre-perforation then the dispenser can be cut open easily. Alternatively, this line is simply a weaker portion of the package.

It should be understood that numerous modifications can be made without departing from the spirit and scope of the disclosure.

What is claimed is:

1. A dispenser comprising:
   a top planar member;
   a bottom planar member, wherein a first peripheral edge of the top planar member and a corresponding first peripheral edge of the bottom planar member are permanently joined to form a first lateral edge, and wherein a second peripheral edge of the top planar member and a corresponding first peripheral edge of the bottom planar member are permanently joined to form a second lateral edge, wherein the first lateral edge and the second lateral edge are sealed;
   a first forward edge extending from the first lateral edge at an angle relative to the first lateral edge;
   a second forward edge extending from the second lateral edge at an angle relative to the second lateral edge, wherein the second forward edge meets the first forward edge at a point to form a forward arrowhead shape;
   a flap at a tip of the forward arrowhead shape on the top planar member, wherein the flap is triangular having three sides, defined on the top planar member, having one side integrally attached to the top planar member and each of the other two sides attached by adhesive to the top planar member;
   a first rear edge extending inwardly into an area between the first lateral edge and the second lateral edge from a rear end of the first lateral edge at an angle relative to the first lateral edge; and
   a second rear edge extending inwardly into an area between the first lateral edge and the second lateral edge from a rear end of the second lateral edge at an angle relative to the second lateral edge and meeting the first rear edge at a central vertex to form an inverted arrowhead shape at a rear of the dispenser,
   wherein the forward arrowhead shape and the inverted arrowhead shape are complimentary,
   wherein the top planar member and the bottom planar member are permanently joined at the first forward edge and the second forward edge to seal the first forward edge and the second forward edge, and wherein the top planar member and the bottom planar member are permanently joined at the first rear edge and the second rear edge to seal the first rear edge and second rear edge.

2. The dispenser of claim 1, wherein the top planar member and the bottom planar member both include foil.

3. The dispenser of claim 1, wherein the top planar member and the bottom planar member are joined using heat treatment.

4. The dispenser of claim 1, wherein the top planar member and the bottom planar member are joined using adhesive.

5. The dispenser of claim 1, wherein the dispenser is one of a plurality of dispensers formed along a top planar member strip and a bottom planar member strip.

6. The dispenser of claim 5, wherein each one of the plurality of dispensers is formed so that the forward arrowhead shape of each dispenser is adjacent to a rear inverted arrowhead shape of a subsequent dispenser.

7. The dispenser of claim 1, wherein the flap on the top planar member is joined to the top planar member at the two sides of the flap using a weaker adhesive or heat treatment than other portions of the dispenser which configures the flap to open when pressure is applied to the dispenser.

8. The dispenser of claim 1, wherein a portion of the top planar member under the flap is partially perforated to form dispensing holes through which a content of the dispenser can be expelled.

9. A plurality of dispensers formed along a top planar member strip and a bottom planar member strip, each dispenser formed so that a forward arrowhead shape is adjacent to a rear inverted arrowhead shape of a subsequent dispenser, each dispenser comprising:
a top planar member;
a bottom planar member,
wherein a first peripheral edge of the top planar member and the bottom planar member are permanently joined to form a first lateral edge, and wherein a second peripheral edge of the top planar member and the bottom planar member are permanently joined to form a second lateral edge, wherein the first lateral edge and the second lateral edge are sealed;
a first forward edge extending from the first lateral edge at an angle relative to the first lateral edge;
a second forward edge extending from the second lateral edge at an angle relative to the second lateral edge, wherein the second forward edge meets the first forward edge at a point to form the forward arrowhead shape;
a flap defined at a tip of the forward arrowhead shape of each dispenser on the top planar member, wherein the flap has three sides defined on the top planar member, wherein one side is integrally attached to the top planar member;
a first rear edge extending inwardly into an area between the first lateral edge and the second lateral edge from a rear end of the first lateral edge at an angle relative to the first lateral edge; and
a second rear edge extending inwardly into an area between the first lateral edge and the second lateral edge from a rear end of the second lateral edge at an angle relative to the second lateral edge and meeting the first rear edge at a central vertex to form the rear inverted arrowhead shape at a rear of the dispenser, wherein the forward arrowhead shape and the rear inverted arrowhead shape are complimentary, wherein the top planar member and the bottom planar member are permanently joined at the first forward edge and the second forward edge to seal the first forward edge and the second forward edge, and wherein the top planar member and the bottom planar member are permanently joined at the first rear edge and the second rear edge to seal the first rear edge and the second rear edge.

10. The plurality of dispensers of claim 9, wherein the top planar member and the bottom planar member both include foil.

11. The plurality of dispensers of claim 9, wherein the top planar member and the bottom planar member are joined using heat treatment.

12. The plurality of dispensers of claim 9, wherein the top planar member and the bottom planar member are joined using adhesive.

13. The plurality of dispensers of claim 9, wherein the flap on the top planar member is joined to the top planar member at the two sides of the flap using a weaker adhesive or heat treatment than is used to join the top planar member to the bottom planar member to make the flap easier to rupture than other portions of the dispenser when pressure is applied to the dispenser.

14. The plurality of dispensers of claim 9, wherein a portion of the top planar member under the flap is partially perforated to form dispensing holes through which a content of the dispenser can be expelled.

15. The dispenser of claim 1, wherein the flap is formed over a precut opening formed in the top planar member, the flap having an integral pull strip configured to allow removal of the flap from the precut opening upon pulling the pull strip.

16. A dispenser comprising:
a top planar member;
a bottom planar member, wherein a first peripheral edge of the top planar member and a corresponding first peripheral edge of the bottom planar member are permanently joined to form a first lateral edge, and wherein a second peripheral edge of the top planar member and a corresponding first peripheral edge of the bottom planar member are permanently joined to form a second lateral edge, wherein the first lateral edge and the second lateral edge are sealed;
a first forward edge extending from the first lateral edge at an angle relative to the first lateral edge;
a second forward edge extending from the second lateral edge at an angle relative to the second lateral edge, wherein the second forward edge meets the first forward edge at a point to form a forward arrowhead shape having a tip;
wherein the top and bottom planar members are joined to each other at the tip so as to be configured to rupture at the tip when a sufficient pressure is applied to the container by use of a weaker sealing between the top and bottom planar members at the tip;
a flap defined at a tip of the forward arrowhead shape of each dispenser on the top planar member, wherein the flap is triangular having three sides, defined on the top planar member, having one side integrally attached to the top planar member and each of the other two sides attached by adhesive to the top planar member;

a first rear edge extending inwardly into an area between the first lateral edge and the second lateral edge from a rear end of the first lateral edge at an angle relative to the first lateral edge; and a second rear edge extending inwardly into an area between the first lateral edge and the second lateral edge from a rear end of the second lateral edge at an angle relative to the second lateral edge and meeting the first rear edge at a central vertex to form an inverted arrowhead shape at a rear of the dispenser, wherein the forward arrowhead shape and the inverted arrowhead shape are complimentary, wherein the top planar member and the bottom planar member are permanently joined at the first forward edge and the second forward edge to seal the first forward edge and the second forward edge, and wherein the top planar member and the bottom planar member are permanently joined at the first rear edge and the second rear edge to seal the first rear edge and second rear edge.

* * * * *